United States Patent
Yan et al.

(10) Patent No.: US 10,685,443 B2
(45) Date of Patent: Jun. 16, 2020

(54) CLOUD DETECTION USING IMAGES

(71) Applicant: Weather Intelligence Technology, Inc, Burlingame, CA (US)

(72) Inventors: Simeng Yan, Fremont, CA (US); Juntao Xiao, Sunnyvale, CA (US)

(73) Assignee: WEATHER INTELLIGENCE TECHNOLOGY, INC, Burlingame, CA (US)

( * ) Notice: Subject to any disclaimer, the term of this patent is extended or adjusted under 35 U.S.C. 154(b) by 210 days.

(21) Appl. No.: 15/958,861

(22) Filed: Apr. 20, 2018

(65) Prior Publication Data

US 2019/0325581 A1 Oct. 24, 2019

(51) Int. Cl.
*G06T 7/13* (2017.01)
*G06T 7/90* (2017.01)
*G06T 11/20* (2006.01)

(52) U.S. Cl.
CPC .................. *G06T 7/13* (2017.01); *G06T 7/90* (2017.01); *G06T 11/20* (2013.01); *G06T 2207/10024* (2013.01); *G06T 2207/30192* (2013.01); *G06T 2210/12* (2013.01)

(58) Field of Classification Search
CPC ... G06T 2207/30192; G06T 7/13; G06T 7/90; G06T 7/12; G06T 2207/10024; G06T 2210/12; G06T 11/20; G01W 1/00; G06K 9/00
See application file for complete search history.

(56) References Cited

U.S. PATENT DOCUMENTS

| | | | | |
|---|---|---|---|---|
| 8,644,605 | B2 * | 2/2014 | Bao | H04N 1/62 382/164 |
| 9,792,522 | B2 | 10/2017 | Shen et al. | |
| 2017/0031056 | A1 * | 2/2017 | Vega-Avila | G01W 1/12 |
| 2017/0293049 | A1 * | 10/2017 | Frank | G01J 5/00 |
| 2017/0293660 | A1 * | 10/2017 | Nachlieli | G06K 9/6253 |
| 2017/0372167 | A1 | 12/2017 | Shen et al. | |
| 2018/0372914 | A1 * | 12/2018 | Yan | G01W 1/10 |
| 2019/0087671 | A1 * | 3/2019 | AlRegib | G06K 9/00818 |

(Continued)

OTHER PUBLICATIONS

"Canny edge detector"; https://en.wikpedia.org/wiki/Canny_edge_detector; Wikipedia; accessed Apr. 20, 2018; 8 pages.

(Continued)

*Primary Examiner* — Yon J Couso
(74) *Attorney, Agent, or Firm* — BakerHostetler

(57) ABSTRACT

Techniques for cloud detection and cloud coverage determination are described herein. The disclosed techniques include detecting a plurality of color clusters among a plurality of data elements of an image, associating at least one of the plurality of color clusters with a cloud based on a characteristic color of the cloud, and determining a number of data elements within the at least one of the plurality of color clusters associated with the cloud. The disclosed techniques also include detecting a location of an object indicative of a cloud in the image based at least in part on training data and a plurality of features extracted from the image, detecting an edge of the object indicative of the cloud at the location, and determining a number of data elements within the edge of the object indicative of the cloud.

20 Claims, 14 Drawing Sheets

(56) References Cited

U.S. PATENT DOCUMENTS

2019/0158011 A1* 5/2019 West .................. G01W 1/10

OTHER PUBLICATIONS

"Convolutional neural network"; https://en.wikipedia.org/wiki/Convolutional_neural_network; Wikipedia; accessed Apr. 20, 2018; 20 pages.
"k-means clustering"; https://en.wikipedia.org/wiki/K-means_clustering; Wikipedia; accessed Apr. 20, 2018; 14 pages.
Uijlings et al.; "Selective Search for Object Recognition"; University of Trento; Technical Report; 2012; 14 pages.

* cited by examiner

| Data Identity | | | Image URL | Bounding Box | Object Type |
|---|---|---|---|---|---|
| 1 SKY2_sunnyrate 04E6788328D3 | 2018-01-18 11:2 | 42.1 | -112.2 | http://s3.us-west-1.amazonaws... | (570,580), (640,580), (570,640), (640,640) | Sun |
| 1 SKY2_sunnyrate 04E6788328D3 | 2018-01-18 11:2 | 42.1 | -112.2 | http://s3.us-west-1.amazonaws... | (400,240), (480,240), (400,610), (480,610) | Cumulus |
| 1 SKY2_sunnyrate 04E6788328D3 | 2018-01-18 11:2 | 42.1 | -112.2 | http://s3.us-west-1.amazonaws... | (200,40), (360,40), (200,100), (360,100) | Cumulus |
| 1 SKY2_sunnyrate 04E6788328D3 | 2018-01-18 11:2 | 42.1 | -112.2 | http://s3.us-west-1.amazonaws... | (200,40), (360,40), (200,100), (360,100) | Non-Sky |
| 2 SKY2_sunnyrate 04E6788328D3 | 2018-01-18 12:0 | 42.1 | -112.2 | http://s3.us-west-1.amazonaws... | (500,50), (640,50), (500,170), (640,170) | Cumulus |
| 2 SKY2_sunnyrate 04E6788328D3 | 2018-01-18 12:0 | 42.1 | -112.2 | http://s3.us-west-1.amazonaws... | (10,120), (83,120), (10,200), (83,200) | Cumulus |
| 2 SKY2_sunnyrate 04E6788328D3 | 2018-01-18 12:0 | 42.1 | -112.2 | http://s3.us-west-1.amazonaws... | (200,40), (360,40), (200,100), (360,100) | Non-Sky |
| 3 SKY2_sunnyrate 04E6788328D3 | 2018-01-18 16:0 | 42.1 | -112.2 | http://s3.us-west-1.amazonaws... | (20,160), (640,160), (20,640), (640,640) | Stratus |
| 3 SKY2_sunnyrate 04E6788328D3 | 2018-01-18 16:0 | 42.1 | -112.2 | http://s3.us-west-1.amazonaws... | (200,40), (360,40), (200,100), (360,100) | Non-Sky |
| 344 SKY2_test | 04E6788328D3 | 2018-01-20 15:1 | 42.1 | -112.2 | http://s3.us-west-1.amazonaws... | No Cloud | N/A |
| 344 SKY2_sunnyrate 04E6788328D3 | 2018-01-30 15:1 | 42.1 | -112.2 | http://s3.us-west-1.amazonaws... | (200,40), (360,40), (200,100), (360,100) | Non-Sky |

FIG. 7

CLOUD DETECTION USING IMAGES

BACKGROUND

Conventional weather forecasters have a variety of tools to obtain weather information, such as weather stations and weather satellites. Weather stations can collect numerical data of wind speed, air temperature, air pressure, and so on. Weather satellites can show cloud formations and large-scale weather events, such as hurricanes. Even so, weather stations are spread miles apart, and typically limited to gather numerical data. Weather satellites are positioned thousands of miles above the earth, and limited to view large-scale weather events. Subject to various limitations, current weather forecast accuracy cannot fulfill needs of people. For example, outdoor enthusiasts or avid travelers need accurate weather forecasts to arrange their outdoor or travelling plans. Likewise, business people need precise and local weather forecasts to optimize processes and decrease weather-related economic risks. Cloud information is a valuable data source for accurate weather forecasts.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 illustrates example training data used for training a cloud locator engine.

DETAILED DESCRIPTION

Techniques for cloud detection and cloud coverage determination are described herein. In accordance with the present disclosure, data collection devices may be installed in any places on the earth, and form a dense network of data collection devices. Preferably, these data collection devices include image capture components for capturing series of sky images.

The disclosed techniques include detecting clouds in images captured by a plurality of data collection devices. In some embodiments, a cloud in an image is detected by detecting a plurality of color clusters among a plurality of data elements of the image and associating at least one of the plurality of color clusters with a cloud based on a characteristic color of the cloud. In an example, the centroids of the plurality of color clusters are detected and the plurality of data elements of the image are assigned to a corresponding closest centroid based on color similarity.

In other embodiments, a cloud in an image is detected by detecting a location of an object indicative a cloud in the image based on training data and a plurality of features extracted from the image. In an example, a contour of the object indicative the cloud may be detected using an edge detection algorithm to improve cloud detection accuracy. The location of the object indicative the cloud may be presented as coordinates of four corners of a box surrounding the object. The training data may comprise pre-labelled information relating to locations and types of clouds, locations of a sun and non-sky objects. The plurality of features comprises at least an identification of a portion of the image as representing a cloud and a type of the cloud. In other examples, locations of non-cloud objects in the image, such as sun and non-sky objects, may also be detected.

The disclosed techniques further include determining a cloud coverage based on a combination of results obtained from various cloud detection methods as described herein. In some embodiments, a cloud coverage is determined based at least in part on an average of a number of data elements within the at least one of the plurality of color clusters associated with a cloud and a number of data elements within the edge of the object indicative of a cloud. An ensemble model of combining various cloud detection techniques significantly improves the accuracy of cloud coverage determination.

Figure 1:
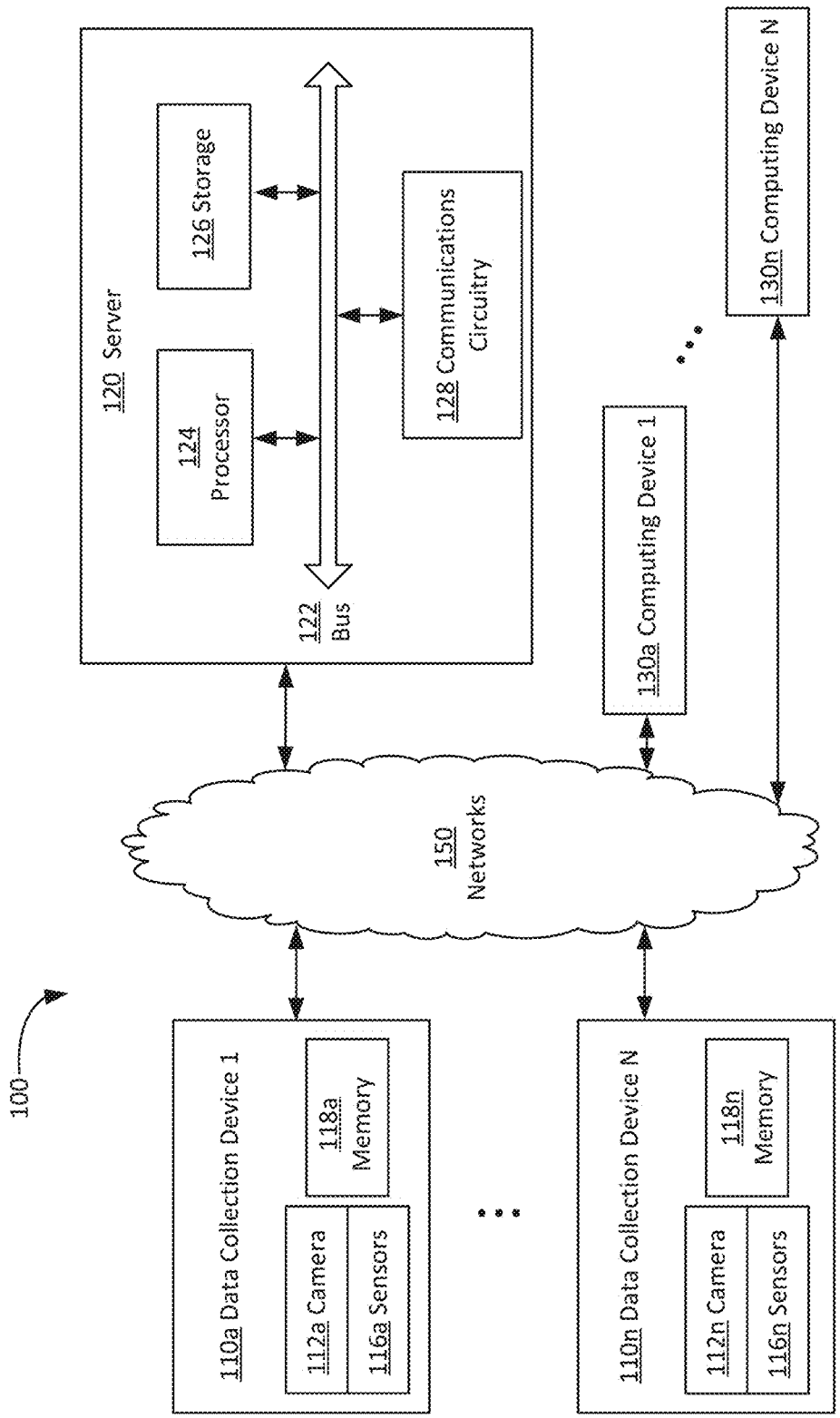
FIG. 1 is a schematic diagram illustrating an example system for collecting and processing data that may be used in accordance with the present disclosure.

FIG. 1 is a schematic diagram illustrating an example system 100 for collecting and processing data that may be used in accordance with the present disclosure. As shown, the system 100 comprises a plurality of data collection devices 110a . . . , and 110n (collectively, 110), at least a server 120, and a plurality of computing devices 130a . . . , and 130n (collectively, 130). The data collection devices 110 and the computing devices 130 may communicate with the server 120 via one or more networks 150.

The data collection devices 110 are used to capture sky images and collect numerical data, such as temperature, humidity, barometric pressure, and precipitation. The data collection devices 110 may be installed in any places on the earth, thereby forming a dense network of weather data collection devices 110. For instance, the data collection devices 110 may be installed in the ground or mounted on any suitable structures. Preferably, the data collection devices 110 are installed in locations with clear view of sky and as far as possible away from tall obstacles, such as trees, buildings, and fences.

The data collection devices 110 comprise cameras 112 for capturing sky images. The cameras 112 may be HD cameras with ultra-wide angle lens (e.g., 170 degree). The cameras may be any other suitable cameras. In some examples, the cameras 112 each may be fixed toward a particular view of sky, and they each may gather a series of time-sequenced sky images of a particular view every day (i.e., an image stream). The data collection devices 110 may capture numerous series of time-sequenced sky images from various locations around the world.

Weather information may be accurately extracted from the sky images captured by the data collection devices 110. In some examples, these images may be used to detect cloud location and cloud type, detect locations of sun and non-sky objects (e.g., buildings and trees), and determine a cloud coverage, thereby enabling, for example, accurate weather forecasting.

The data collection devices 110 may further comprise memories 118 for storing images and other data. Typically, the data collection devices 110 may transmit data via the networks 150 to the server 120 for storing and processing.

The server 120 may host one or more applications configured to manage services. For example, the server 120 may be configured to validate the computing devices 130 before they are authorized to access stored data. The server 120 may maintain information related to a user account including account details and others. The server 120 may operate one or more image libraries comprising images captured by the data collection devices 110, which may be accessed by the computing devices 130. Also, the server 120 may host one or more applications configured to interact with applications stored on the computing devices 130.

The server 120 may include a bus 122 which interconnects major components of the server 120, such as one or more processors 124, one or more storage devices 126, and communications circuitry 128. The processors 122 may be any suitable programmable control devices. The processors 122 may process data captured by the data collection devices 110 and extract various information from image data. The storage devices 126 may be integral with the server 120 or may be separate and accessed through an interface. The storage devices 126 may store images captured by the data collection devices 110, software for implementing various functions on the server 120, and other data. The communications circuitry 128 may include one or more interfaces to allow the server 120 to communicate with the data collection devices 110, the computing devices 130, other servers, and/or databases via the one or more networks 150. The server 120 may be a cloud-based server.

Figure 2:
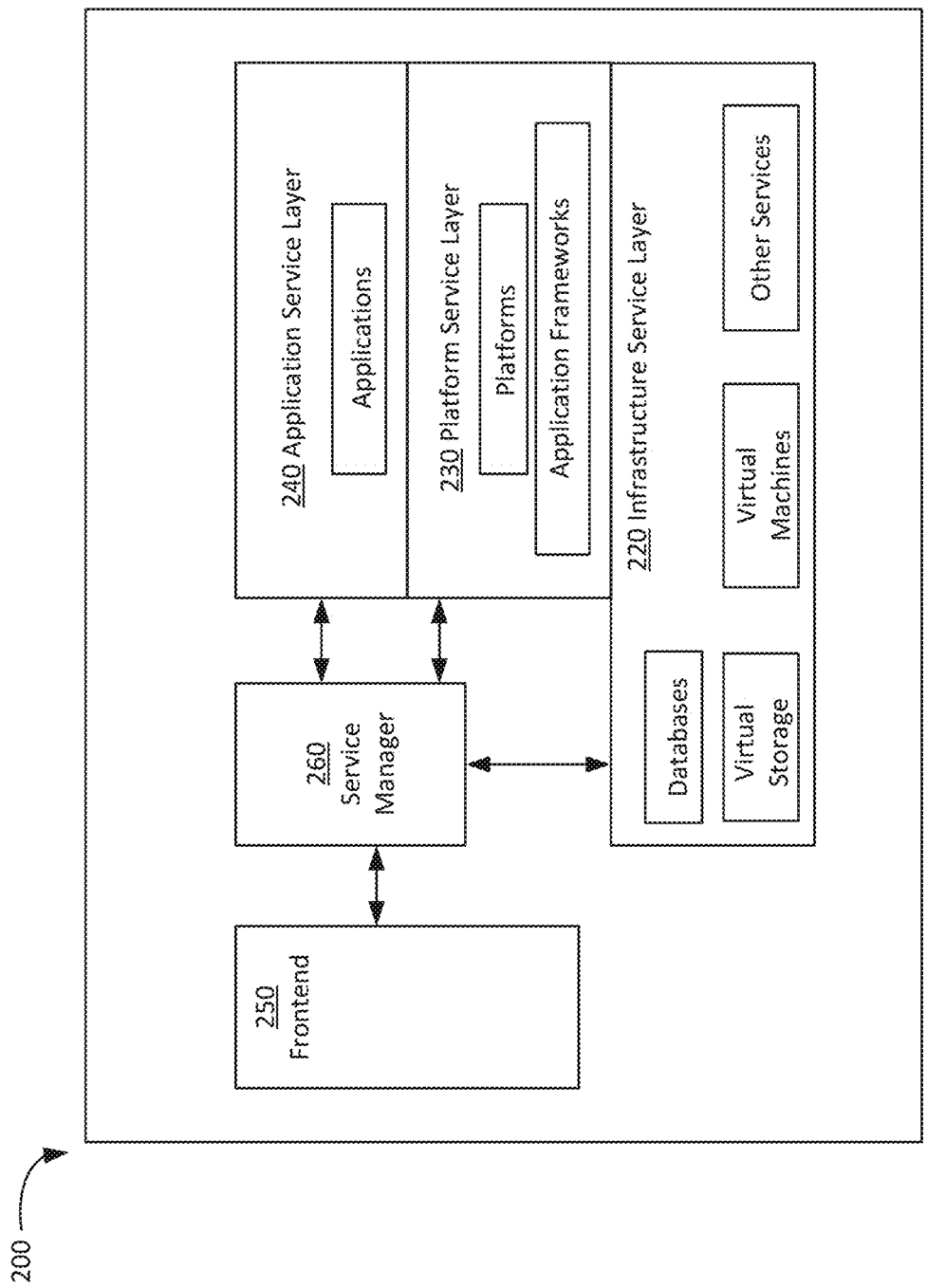
FIG. 2 is a schematic diagram illustrating an example cloud-based server that may be used in accordance with the present disclosure.

FIG. 2 is a schematic diagram illustrating an example cloud-based server 200 that may be used in accordance with the present disclosure. The cloud-based server 200 may provide infrastructure services, platform services, and software application services. The infrastructure services may include virtualized resources, such as virtual machines, virtual storage, and so on. The infrastructure services may also include virtualized services, such as database services and others. Each of these infrastructure services may be deployed in an infrastructure service layer 220.

The scale and various aspects, such as data, connectivity, and dependency relationships within and between service components, of an infrastructure service deployment are configurable by an administrator user. For instance, the administrator user may submit a configuration specification to the cloud-based server 200 via a frontend interface 250 and service manager 260. The configuration specification can be translated into infrastructure and kernel level APIs calls that create, re-create, move, or delete components such as virtual machines and services, and assign or change attributes of the components.

In addition to the infrastructure services, the cloud-based server 200 may also provide platform services, such as an environment for running virtual machines or a framework for developing and launching a particular type of software applications. The platform services may be implemented in a platform service layer 230 over the infrastructure service layer 220, and may employ one or more infrastructure services configured in a particular manner. Configuration of platform services can be accomplished by program code written according to the APIs of the platform services and, optionally, the APIs of the infrastructure services that are employed in enabling the platform services.

In some examples, the cloud-based server 200 may also provide software application services in an application service layer 240. A software application can be installed on one or more virtual machines or deployed in an application framework in the platform service layer 230. The software application can also communicate with one or more infrastructure service components, such as databases, in the infrastructure layer 220. The installation and configuration of the software application in the application service layer 240 can be accomplished through APIs of the software itself and the APIs of the underlying platform and infrastructure service components.

Depending on the type of services, a cloud-service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

Figure 3:
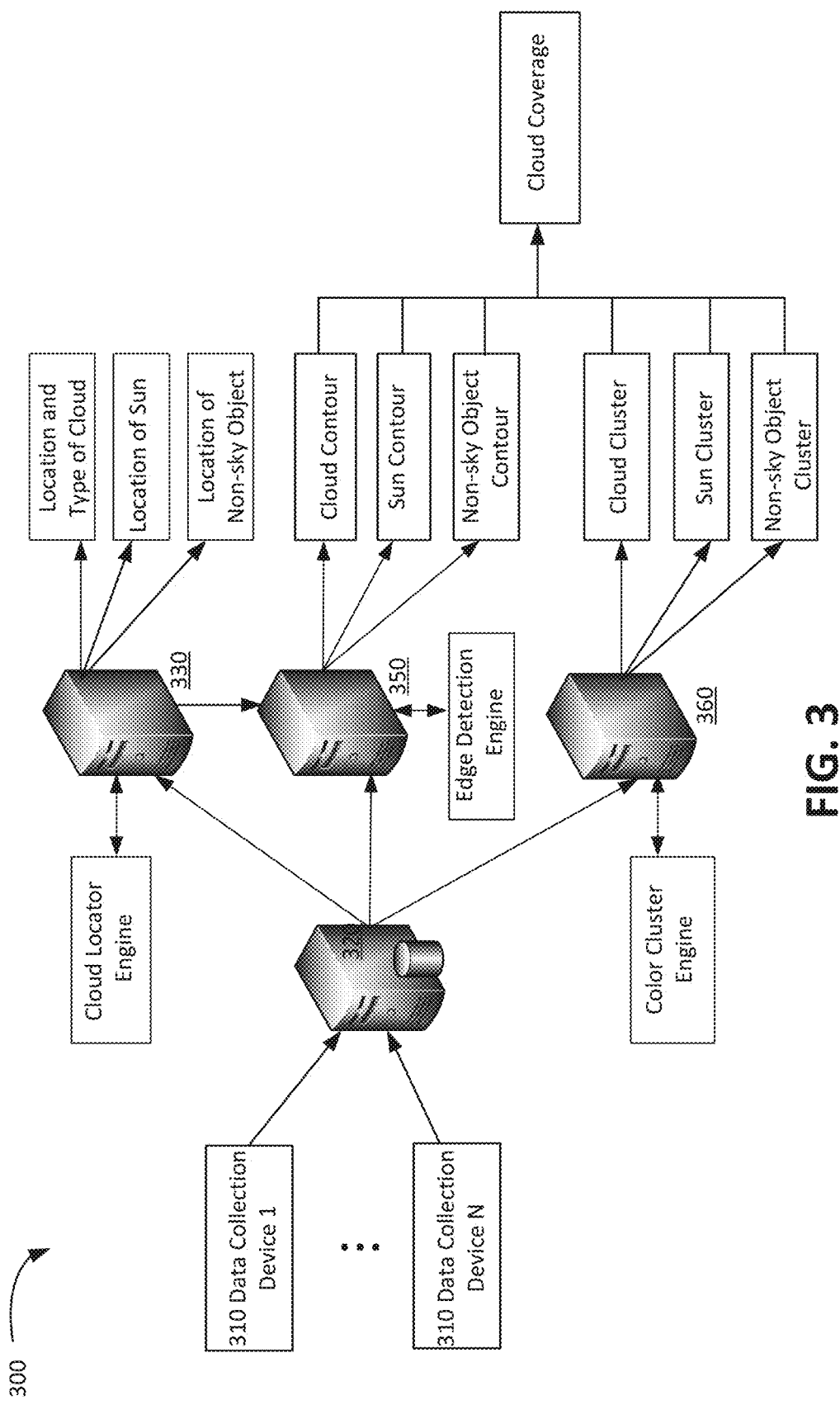
FIG. 3 is a schematic diagram illustrating a network environment of a system for cloud coverage determination in accordance with the present disclosure.

FIG. 3 illustrates an example system 300 for determining cloud coverage in accordance with the present disclosure. The system 300 comprises a plurality of data collection devices 310 (e.g., the data collection devices 110), one or more databases 320, a cloud locator engine 330, an edge detection engine 350, and a color cluster engine 360. The plurality of data collection devices 310 are capable of capturing high-resolution sky images. The plurality of data collection devices 310 may be installed anywhere around the world.

The sky images collected by the plurality of data collection devices 310 may be stored in the databases 320. The databases 320 may provide sky images captured by the data collection devices 310 to the cloud locator engine 330, the edge detection engine 350, and the color cluster engine 360.

The cloud locator engine 330 is capable of detecting location and type of cloud, locations of sun and non-sky objects in the sky images, tracking cloud movement, and determining a cloud coverage. The edge detection engine 350 is capable of detecting boundaries of cloud, sun, non-sky objects in the sky images and determining a cloud coverage. The color cluster engine 360 is capable of detecting cloud areas in the sky images based on color clusters and determining a cloud coverage. Accuracy of cloud coverage determination may be significantly improved by collaboratively using the cloud locator engine 330, the edge detection engine 350, and the color cluster engine 360.

It should be appreciated that network topology illustrated in FIG. 3 has been greatly simplified and that many more networks and devices may be utilized to interconnect the various computing systems disclosed herein. It should also be appreciated that the system 300 described in FIG. 3 is merely illustrative and that other implementations might be utilized.

Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The plurality of data collection devices 310 may be the data collection devices 110 as described above. Preferably, numerous data collection devices 310 form a dense network of collecting sky images and numerical data. The data collection devices 310 may take real-time sky images from the ground. Compared to Doppler radar cloud map and remote sensing signals from satellites, the data and images captured by the data collection devices 310 feature higher frequency and higher localization. The numerical data and sky images collected by the data collection devices 310 may be transmitted to and stored in the databases 320.

Figure 4:
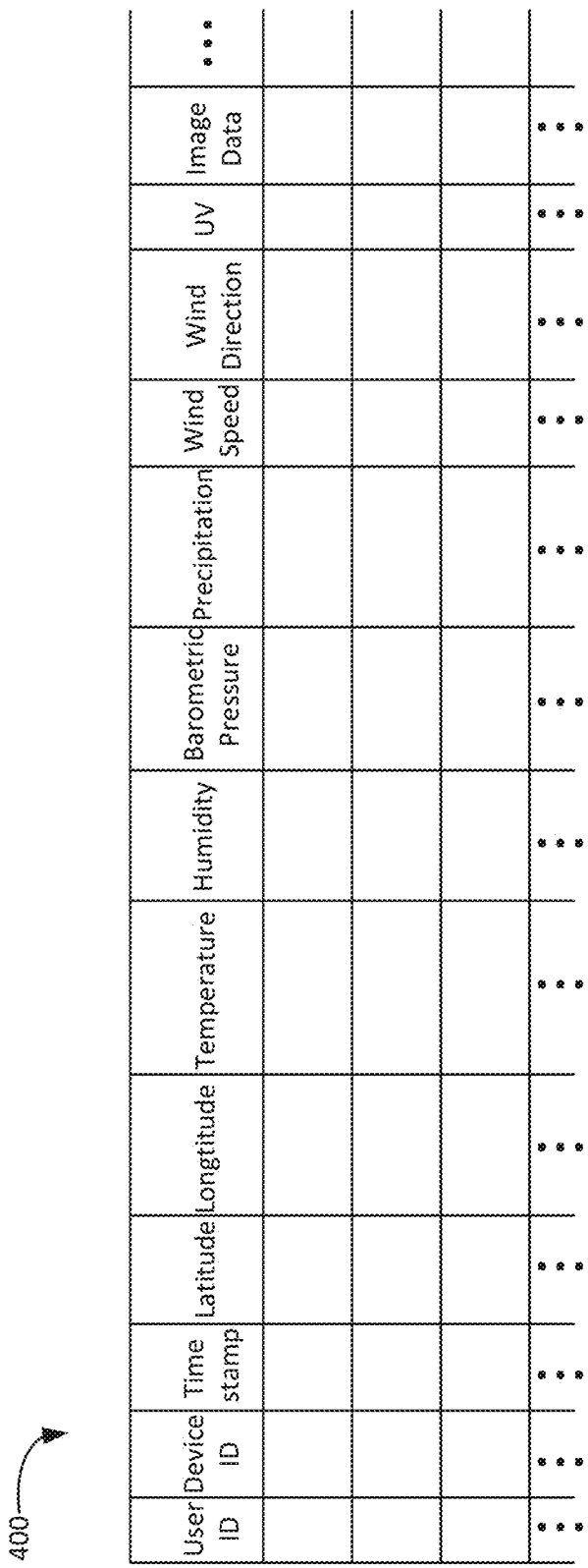
FIG. 4 is a simplified diagram illustrating example data metrics of a database that may be used in accordance with the present disclosure.

FIG. 4 is a simplified diagram illustrating example data metrics 400 of the databases 320 that may be used in accordance with the present disclosure. As shown, data metrics 400 include user ID, device ID, timestamp, latitude, longitude, image data, and so on. Multiple databases may be organized in any suitable way that can support data processing. For instance, a separate database may be created to store sky images captured by the data collection devices 310 along with corresponding ID, timestamp, latitude and longitude. The databases 320 may be updated periodically in order to reflect new data. The databases 320 may be broken into subsets of data and processed in parallel by separate systems.

The cloud locator engine 330 may access or receive various data, such as sky image data stored in the databases 320 and data received from users. The cloud locator engine 330 may also generate or cause to generate data. In some embodiments, the cloud locator 330 may monitor new images collected by the data collection devices 310. It should be understood that the cloud locator engine 330 may gather data from any of computing resources including servers, databases, storage, and the like. The cloud locator engine 330 may be made accessible via an application programming interface (API) or a user interface that may be accessed via a Web browser or other input mechanisms. The cloud locator engine 330 may provide data to the edge detection engine 350 for further data processing. The cloud locator engine 330 may also provide an analysis of cloud information to requesting users.

Cloud information, such as cloud coverage, is a valuable data source for weather forecast. For instance, cloud coverage significantly affects temperature on the ground. Cloud coverage describes the amount of clouds in the sky. Cloud coverage is also known as cloud fraction, cloud cover, or cloudiness. Cloud coverage may be measured as a percentage or as a fraction.

The cloud locator engine 330 leverages object detection methods in deep learning to detect location and type of cloud, locations of sun and non-sky objects in sky images. Cloud coverage may be determined based on information extracted from the sky images using the cloud locator engine 330. The cloud locator engine 330 may also be used for real-time cloud tracking and other applications.

Figure 5:
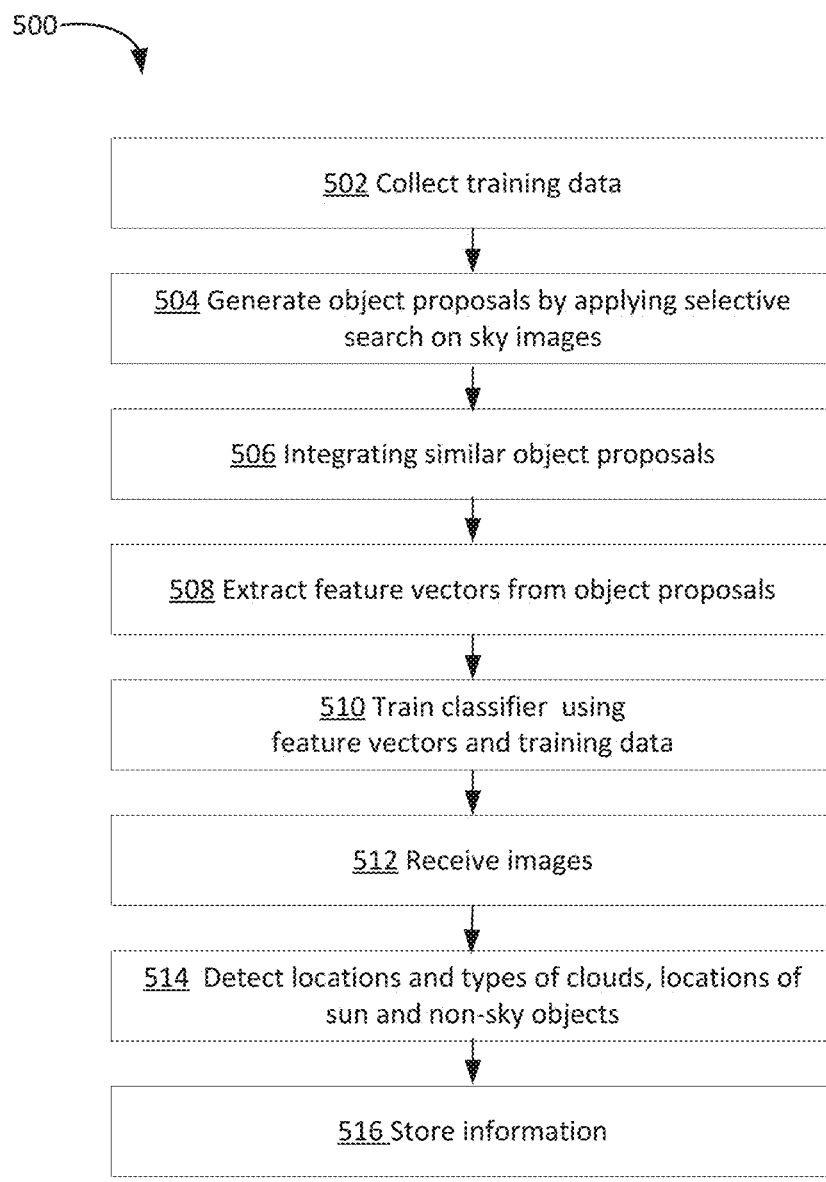
FIG. 5 is a flowchart illustrating an example process of a cloud locator engine that may be used in accordance with the present disclosure.

FIG. 5 is a flowchart illustrating an example process 500 for the cloud locator engine 330. Any suitable servers or computing devices may be used singly or in combination to implement the process 500. Although depicted as a sequence of operations, those of ordinary skill in the art will appreciate that various embodiments may add, remove, reorder, or modify the depicted operations. The cloud locator engine 330 may gather data from any components, such as the databases 320. The cloud locator engine 330 may also collect information stored in other locations or resources. The cloud locator engine 330 may manage various data. The cloud locator engine 330 may also generate or cause to generate data. The cloud locator engine 330 may analyze the data, combine or aggregate the data or extract portions of the data as appropriate.

Figure 6:
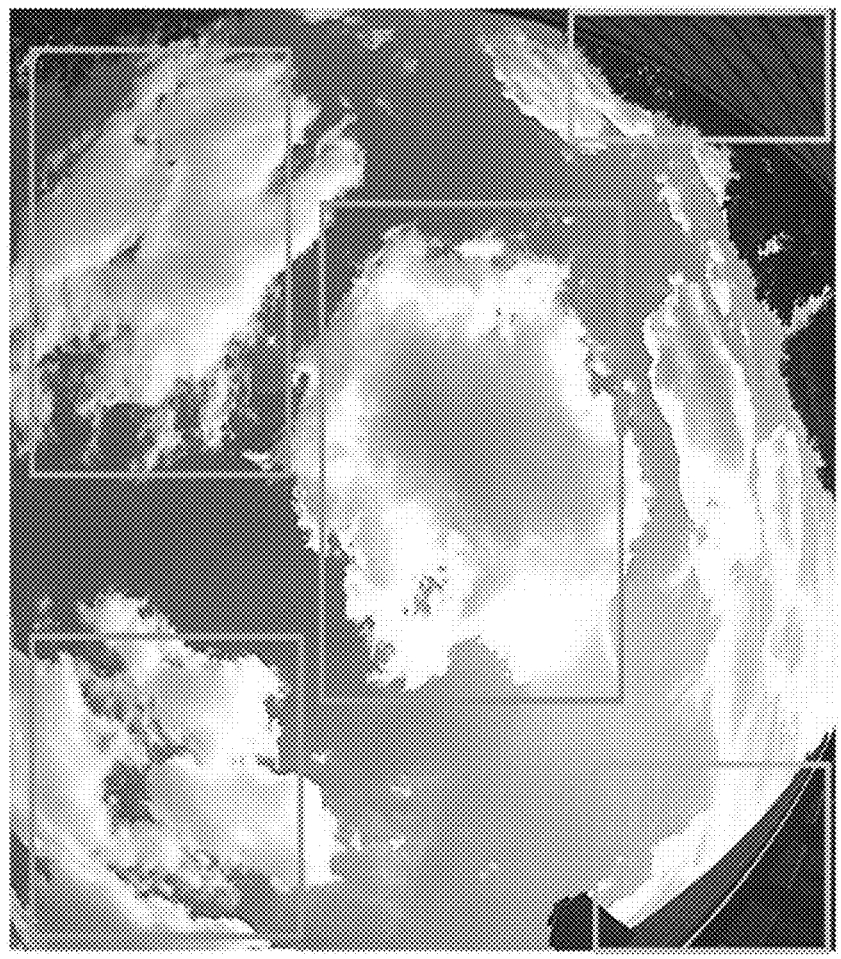
FIG. 6 illustrates an example of a pre-labeled image used for training a cloud locator engine.

Operation 502 illustrates acquiring training data. The training data are used to train deep learning algorithms for recognizing location and type of cloud, and locations of sun and non-sky objects in a sky image. FIG. 6 illustrates an example of a sky image pre-labeled with location and type of cloud, and locations of non-sky objects.

As shown in FIG. 6, the three boxes in the upper area of the image indicate locations of clouds in the image. The cloud locations may be presented by coordinates of four corners of each corresponding box. By way of example and without any limitation, the bottom left corner of the image may be used as the origin of the coordinate plane. For instance, the cloud location indicated by the box located approximately at the center of the image may be presented as the coordinates of four corners, i.e., (200, 150), (500, 150), (200, 400), and (500, 400). The two boxes in the lower area of the image indicate non-sky objects, such as buildings. The locations of the non-sky objects may also be presented as coordinates of four corners of each corresponding box. For example, the non-sky object location indicated by the box in the bottom left corner may be presented as the coordinates of the four corners, i.e., (0, 0), (110, 0), (0, 180), and (110, 180). It should be appreciated that the bounding boxes indicative of clouds or non-cloud objects may have any suitable shape, such as a rectangle or trapezoid.

The type of cloud may be labeled in a text box. For instance, the type of cloud. e.g., cumulus, is recorded in a text box near the image as shown in FIG. 6. It should be understood that there may be multiple text boxes indicating various types of cloud when the clouds labeled by bounding boxes have different types. Type of cloud may be any of cumulus, cirrus/cirrostratus, cirrocumulus/altocumulusz, stratocumulus, stratus/altostratus, cumulonimbus/nimbostratus, or others.

It should be appreciated that FIG. 6 is merely illustrative. It is to be understood that the manners of labeling a sky image and labeling information are not limited to what is shown in FIG. 6. It should be appreciated that the location of a sun may also be indicated by a bounding box although FIG. 6 does not show a box indicative of the sun. Different colors and/or shapes may be used to distinguish bounding boxes indicative of cloud, sun, and non-sky object, respectively. By way of example and without any limitation, an orange box may be indicative of any cloud, a red box may be indicative of the sun, and a green box may be indicative of any non-sky object.

FIG. 7 illustrates example data for training the cloud locator engine 330. The training data include image ID information (i.e., record ID) and data collection device ID information, such as user ID (i.e., station name) and device ID (i.e., station ID). The training data also include timestamps that indicate when the sky images are captured, and location information (i.e., latitude and longitude) that indicates where the sky image are captured. The training data further comprise image URLs and labeling information, such as the coordinates of four corners of each bounding box and the object type corresponding to each bounding box. It should be appreciated that FIG. 7 is merely illustrative and without any limitation at all. Preferably, the model training is performed on a Graphics Processing Unit (GPU) cluster.

The cloud locator engine 330, at operation 504, may apply a selective search algorithm on the sky images and generate a certain number of object proposals included in the sky images. In an embodiment, the cloud locator engine 330 generates around 500-1000 object proposals that may be further split into smaller ones. At operation 506, the cloud locator engine 330 may combine similar object proposals based on similar color, pattern and maximum area of bounding boxes.

Operation 508 illustrates extracting feature vectors from the generated object proposals. In an example, a Convolutional Neural Networks (ConvNets) infrastructure, such as AlexNet, may be used to extract features. Generally speaking, ConvNets with the multi-layer neural network structure, especially convolutional layers that apply a convolution operation to the input, is capable to effectively extract significant features embedded in the images. In some embodiments, the dimension of the features is approximately 1000.

Operation 510 illustrates training a classifier using extracted feature vectors and training data. In an embodiment, a classifier, such as Linear SVM or Logistic Regression, is trained to learn the labels relating to location and type of cloud and locations of sun and non-sky object in each object proposal based on the feature vectors generated at operation 508.

The model performance may be assessed by cross validation or other methods to evaluate the classification model. If the model performance is not satisfactory, the process 500 may return to operation 502 so as to collect more training data and further train the model. On the other hand, if the model performance is satisfactory, the process 500 may proceed to operation 512. It should be appreciated that any suitable techniques for determining whether the model performance is satisfactory may be employed.

Operation 512 illustrates receiving sky images. In some embodiments, the images may be provided by the data collection devices 310 or other image capturing devices. In other embodiments, the image data may be provided by the weather databases 320 or other separate cloud storage servers in which the sky images are stored.

Operation 514 illustrates detecting locations and types of clouds, and locations of sun and non-sky objects in sky images. By way of example and without any limitation, the location of cloud may be presented as coordinates of four corners of a corresponding bounding box in the order of bottom left, bottom right, top left, and top right corners. Similarly, the location of a non-cloud object may be presented as coordinates of four corners of a corresponding bounding box. In some examples, the recognition result relating to types of cloud within bounding boxes may be presented as one or more cloud types and corresponding probabilities of each type of cloud.

It should be appreciated that, depending on the sky images' capture times and locations, the process 500 may be used to determine cloud information at a given location at different times, cloud information at different locations at the same time, or aggregate cloud information over a certain area within a certain time of period based on the timestamps and location information associated with the sky images.

In some embodiments, the cloud locator engine 330 may further determine a cloud coverage using extracted information about locations of clouds and non-sky objects in the sky images. The number of data elements (e.g., pixels) within the area at the detected cloud location (L_cloud) may be determined. Similarly, the number of pixels within the area at the non-sky object locations (L_nonsky) may be determined. The number of pixels within the area at the detected sun location (L_sun) may also be calculated. Given that the total number of pixels of a sky image (L_total) is known, the number of the rest of pixels that are not within the cloud, sun, and non-sky areas (L_restsky) may be determined as well.

A cloud coverage may be determined based on a proportion of a number of pixels in the cloud area (L_cloud) to a number of pixels in the sky area (L_sky). In some embodiments, the L_sky may be determined by the total number of pixels in the image (L_total) minus the number of pixels in the non-sky area (L_non-sky), i.e., L_sky=L_total−L_non-sky. Then, the cloud coverage (Cov %) may be determined using the formula of Cov %=L_cloud/(L_total−L_non-sky). In other embodiments, the L_sky may be determined using the formula of L_sky=L_cloud+L_sun+L_restsky; therefore, the cloud coverage may be determined using the formula of Coverage=L_cloud/(L_cloud+L_sun+L_restsky).

Operation 516 illustrates storing the determined information, such as cloud types, locations of cloud, sun and non-sky objects, and the cloud coverage. The determined information may be stored locally, in the database 320, or other separate storage server or computing device. In some embodiments, at least a part of the determined information may be directly fed into the edge detection engine 350.

The edge detection engine 350 may detect contours of objects in a sky image and further determine a cloud coverage. The edge detection engine 350 may receive data from any components, such as the data collection devices 310, the databases 320, the cloud locator engine 330, or any other data resources. The edge detection engine 350 may manage various data. The edge detection engine 350 may also generate or cause to generate data. The edge detection engine 350 may analyze the data, combine or aggregate the data or extract portions of the data as appropriate.

Figure 8B:
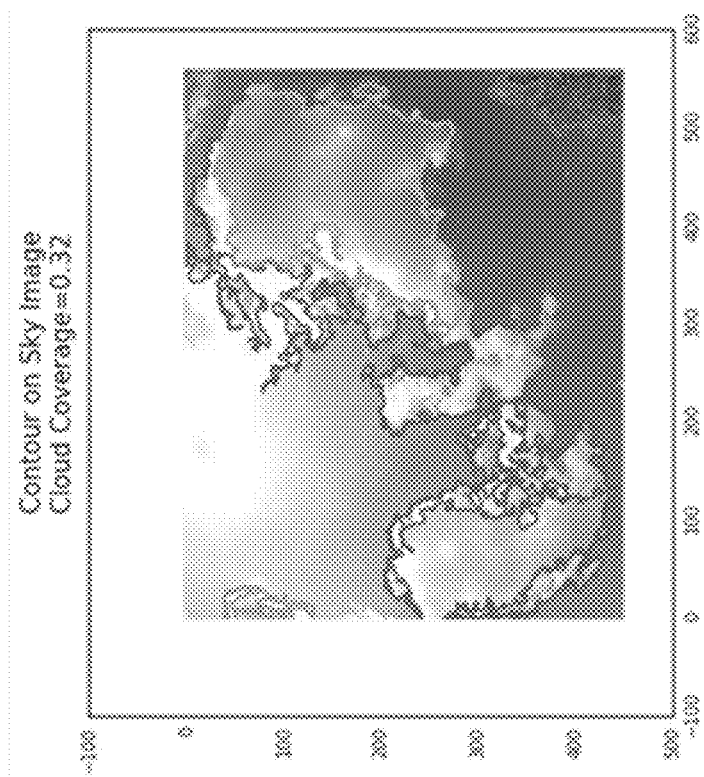
FIGS. 8A-8B illustrates example edges and contours detected by an edge detection engine.
Figure 8A:
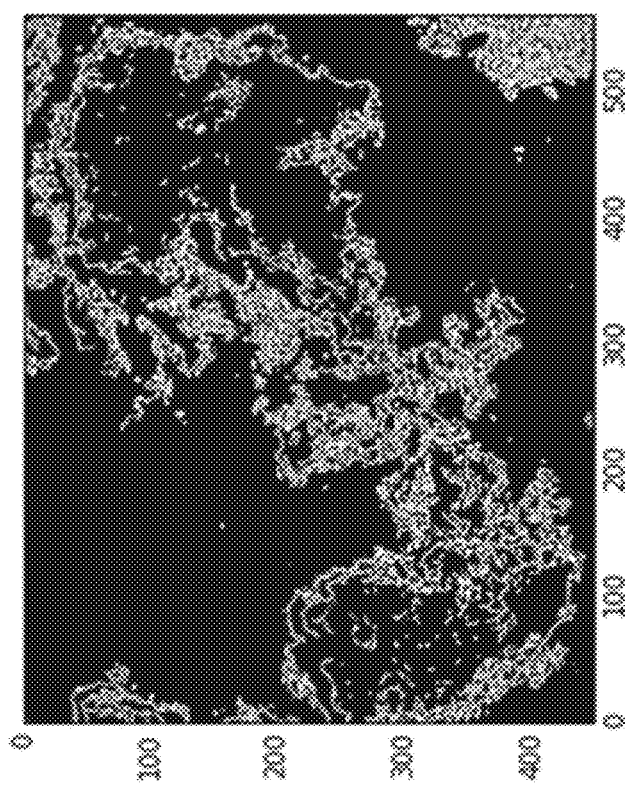

In some embodiments, Canny edge detector may be used to detect the boundaries of different objects, such as cloud, sun and non-sky objects. Before implementing Canny edge detection, the image data corresponding to a sky image may be converted into grey channel. FIG. 8A illustrates detected edges using the Canny edge detector. To improve the accuracy of edge detection. Gaussian filter may be used for noise-removing and double thresholds may be used to select strong edge pixels with high gradient values. Gaussian filter may be replaced by any other suitable filters having similar functions.

Clouds, sun, and non-sky objects are in different color ranges. For instance, a sky image may have a range of RGB average values from 0 to 255. The cloud area in the image may have a range of RGB average values approximately from 100 to 244 with a standard deviation lower than 50; the sun area may have RGB average values greater than 244; and the non-sky area may have RGB average values less than 80. With respect to the gradients of RGB (Red, Green, Blue) values belonging to different objects, the contours of different objects may be formed by connecting all continuous points along the object edges.

Whether objects having contours are cloud, sun, or non-sky object may be determined based on their respective characteristic color ranges. In some embodiments, the edge detection engine 350 may determine a cloud coverage by dividing a number of pixels indicative of clouds by a number of pixels indicative of the sky area. The number of pixels indicative of the sky area in an image equals a total number of pixels in the image minus a number of pixels indicative of the non-sky objects. FIG. 8B illustrates contours of objects in the image and a cloud coverage being determined as 0.32.

Figure 9:
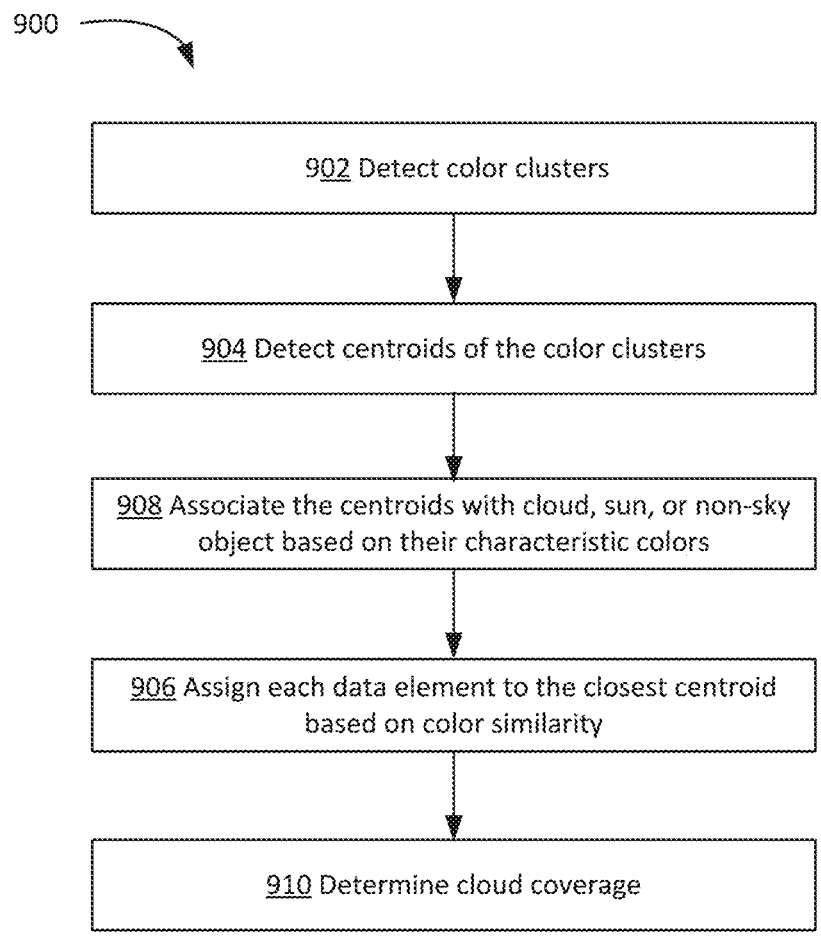
FIG. 9 is a flowchart illustrating an example process for determining cloud coverage using a color cluster engine.

FIG. 9 is a flowchart illustrating an example process 900 for detecting cloud and determining a cloud coverage using the color cluster engine 360. The color cluster engine 360 detects the cloud, sun, and non-sky areas in sky images based on color clusters instead of scanning color values pixel by pixel. This color clustering algorithm takes color continuity belonging to specific objects into consideration, thereby effectively reducing the interference from the non-sky noises in the mages, such as a small white house or reflected light on the ground.

Any suitable servers or computing devices may be used singly or in combination to implement the process 900. Although depicted as a sequence of operations, those of ordinary skill in the art will appreciate that various embodiments may add, remove, reorder, or modify the depicted operations. The color cluster engine 360 may gather data from any components, such as the databases 320. The color cluster engine 360 may also collect information stored in other locations or resources. The color cluster engine 360 may manage various data. The color cluster engine 360 may also generate or cause to generate data. The color cluster engine 360 may analyze the data, combine or aggregate the data or extract portions of the data as appropriate.

Operation 902 illustrates detecting major color clusters in sky images. In some embodiments, the images may be provided by the data collection devices 310 or other image capturing devices. In other embodiments, the images may be provided by the weather databases 320 or other separate cloud storage servers in which sky images as well as their corresponding timestamps and location information are stored. By way of example and without any limitation, a number of major color clusters in sky images (K) may be selected in a range of from 10 to 40. In an embodiment, a particular K may be identified by running K-Means clustering algorithm for a range of K values and comparing the results. Suitable techniques for validating K include cross-validation, information criteria, the information theoretic jump method, the silhouette method, the G-means algorithm, and others.

Operation 904 illustrates detecting the centroids of the color clusters in a sky image. In an example, data elements (e.g., pixels) in the image may be reshaped from a matrix into a list of the date elements. In some embodiments, the K centroids of the K color clusters may be detected by running the K-Mean clustering algorithm on the list of the pixel values. The K-Mean clustering is a type of unsupervised learning, which is used when a user has unlabeled data (i.e., data without defined categories or groups). The goal of this algorithm is to find color clusters in the image data, with the number of color clusters represented by the variable K. The color cluster engine 360 may use the K-Mean clustering algorithm to detect the centroids of major color clusters in sky images. Each centroid defines a corresponding color cluster.

Operation 906 illustrates associating each of the centroids with a cloud, sun, or non-sky object based on the characteristic color values of cloud, sun, and non-sky object. The characteristic color value (e.g., RGB average) of clouds may be in a range of from 100 to 244 with a standard deviation less than 50. The characteristic color value (e.g., RGB average) of non-sky objects may be less than 80. The characteristic color value (e.g., RGB average) of the sun may be greater than 244.

Figures 10A, 10B:
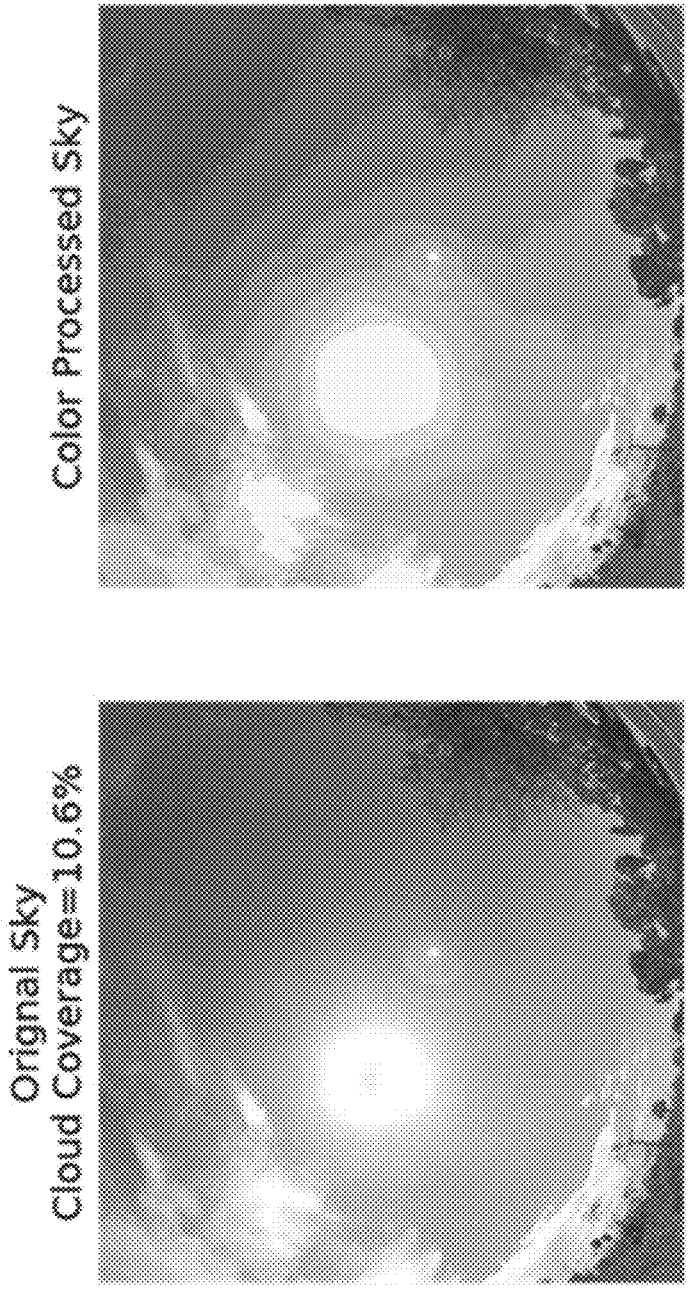
FIGS. 10A-10B illustrates an example of an image representing a partially cloudy condition before and after being processed by a color cluster engine.
Figures 11A, 11B:
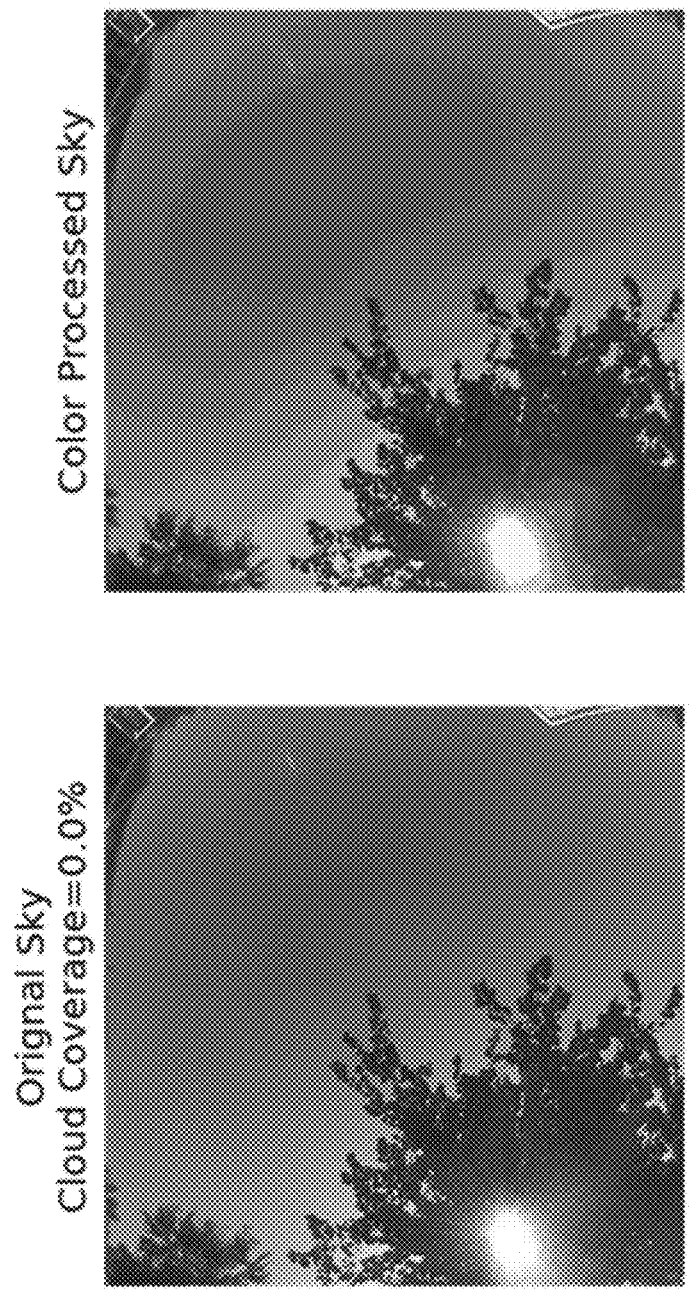
FIGS. 11A-11B illustrates an example of an image representing a sunny weather condition before and after being processed by a color cluster engine.
Figures 12A, 12B:
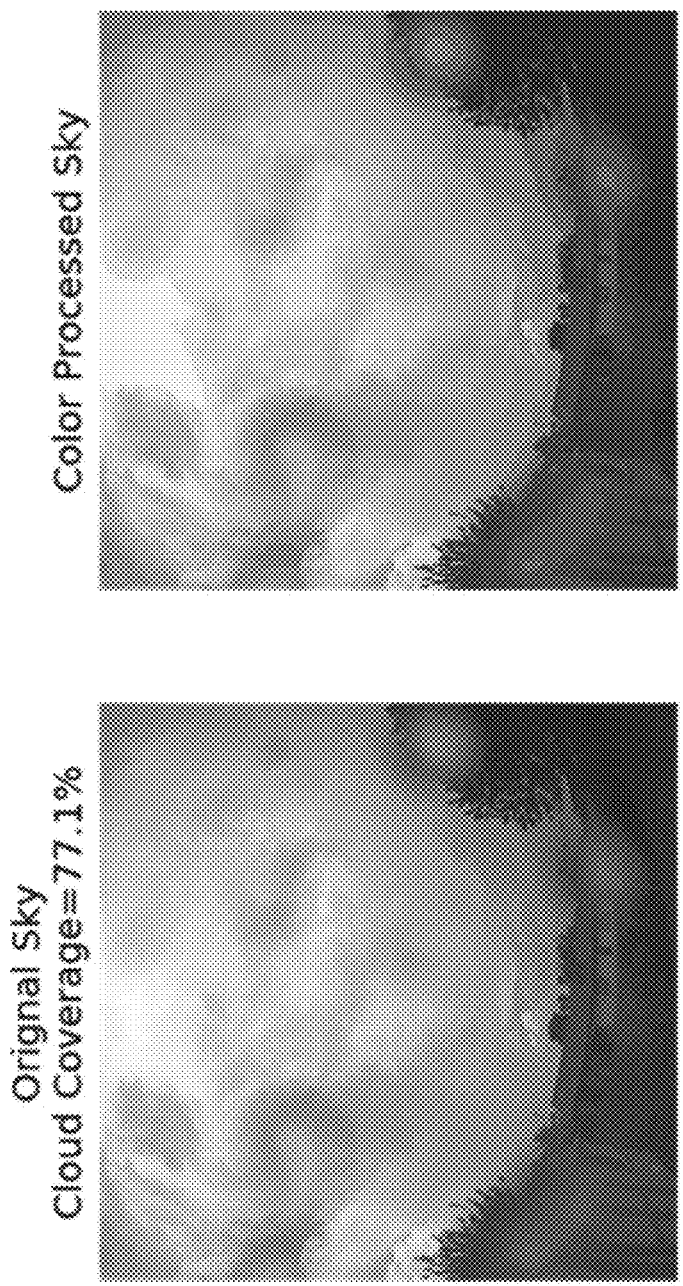
FIGS. 12A-12B illustrates an example of an image representing a cloudy weather condition before and after being processed by a color cluster engine.

Operation 908 illustrates assigning each data element (e.g., pixel) to the closest centroid based on color similarity. FIG. 10B illustrates an example of a sky image representing a partially cloudy condition and including color clusters detected by the color cluster engine 360. FIG. 11B illustrates an example of a sky image representing a sunny weather condition and including color clusters recognized by the color cluster engine 360. FIG. 12B illustrates an example of a sky image representing a cloudy weather condition and including color clusters detected by the color cluster engine 360.

Operation 910 illustrates determining a cloud coverage. A cloud coverage may be determined based on a proportion of a number of data elements (e.g., pixels) in color clusters associated with clouds (C_cloud) to a number of data elements (e.g., pixels) in the sky area (C_sky). The C_cloud may be determined by the cloud color cluster engine 360 or any other separate computing device. Similarly, the number of pixels in the color clusters associated with non-sky objects (C_non-sky) may be calculated as well. Given the total number of pixels in a sky image (C_total) is known, a cloud coverage of the sky image may be determined using the formula of Coverage=C_cloud/C_sky=C_cloud/(C_total−C_non-sky).

In some embodiment, the number of pixels in the color clusters associated with the sun (C_sun) may also be calculated. Given that the total number of pixels of a sky image (C_total) is known, the number of the rest of pixels that are not within color clusters associated with cloud, sun, or non-sky objects (C_restsky) may be determined by C_restsky=C_total−C_cloud−C_sun−C_non-sky. A cloud coverage may also be determined using the formula of Coverage=C_cloud (C_sky=C_cloud/(C_cloud+C_sun+C_restsky). FIGS. 10A, 11A, and 12A illustrate examples of sky images with determined coverages.

As described above, each of the cloud locator engine 330, the edge detection engine 350, and the color cluster engine 360 may detect cloud and determine cloud coverage using different algorithms. The three algorithms of detecting cloud have their respective pros and cons. For instance, the cloud locator engine 330 may provide accurate detection of cloud and non-cloud objects and have great scalability in production by leveraging GPU infrastructure. However, it requires labeling preparation and domain knowledge of model training and validation; it has deployment complexity and is slow on Central Processing Unit (CPU). The edge detection engine 350 may accurately detect a large area of cloud, but it may not detect small chunks of clouds. It has been found that the color cluster engine 360 works quite well for most of whether situations. The color cluster engine 360 is versatile on cloud detection and insensible to cloud shape;

however, it requires higher computational cost as the number of color clusters increases. In addition, non-sky noise may have an impact on the accuracy of cloud detection using the edge detection engine 350 and the color cluster engine 360.

Figure 13:
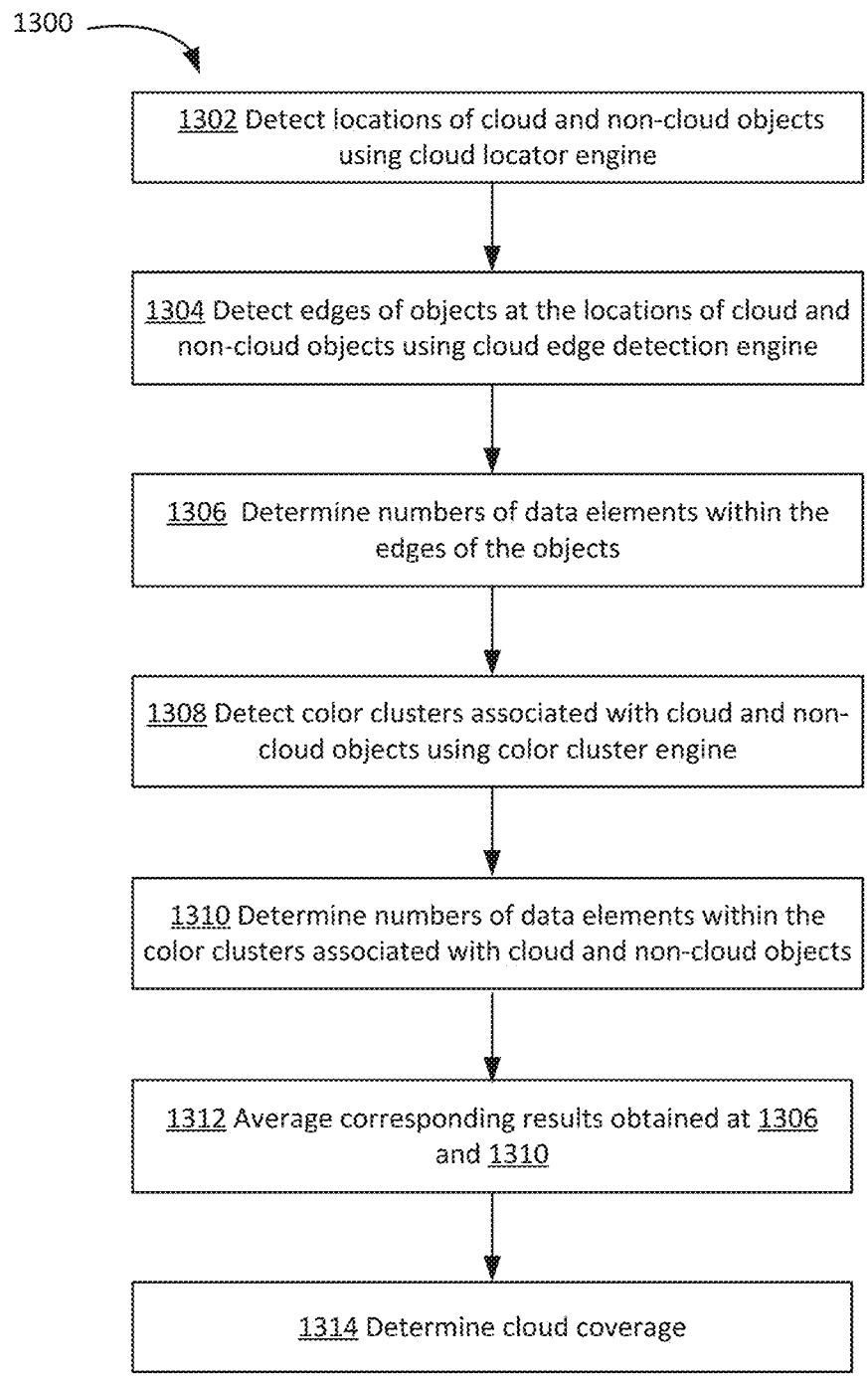
FIG. 13 is a flowchart illustrating an example process for determining cloud coverage using an ensemble method in accordance with the present disclosure.

The three algorithms may be used together to achieve a very high accuracy of cloud detection and cloud coverage determination. FIG. 13 is a flowchart illustrating an example process 1300 for implementing an ensemble method by collaboratively using the cloud locator engine 330, the edge detection engine 350, and the color cluster engine 360. The ensemble algorithm is empowered by deep learning and image processing. This ensemble algorithm is capable of dynamically removing non-sky noises and reducing detection errors, thereby significantly improving the accuracy of detecting cloud and determining cloud coverage.

A server or other computing device may be used singly or in combination to implement the ensemble process 1300. Although depicted as a sequence of operations, those of ordinary skill in the art will appreciate that various embodiments may add, remove, reorder, or modify the depicted operations.

Operation 1302 illustrates detecting locations of cloud and non-cloud objects using the cloud locator engine 330. In some embodiments, the cloud locator engine 330 may receive image data from the data collection devices 310, the databases 320, or any other data resources. The same image data may also be provided to the color clustering engine 360 for data processing. The cloud locator engine 330 may detect cloud locations (i.e., cloud areas $S_0$) and non-cloud object locations (i.e., non-cloud areas $S_1$) in the sky images using the algorithm as described above and any other similar algorithms that fall within the scope of this disclosure.

Operation 1304 illustrates detecting edges of clouds within the cloud areas $S_0$ and edges of objects within the non-cloud areas $S_1$ using the edge detection engine 350. In some embodiments, the edge detection engine 350 may receive the data and information relating to the cloud areas $S_0$ and the non-cloud areas $S_1$ directly from the cloud locator engine 330. In other embodiments, pre-stored information relating to cloud areas S0 and non-cloud areas S1 may be provided to the edge detection engine 350 for further processing. The edge detection engine 350 may detect contours of clouds within the cloud areas $S_0$ and contours of objects (e.g., non-sky objects and sun) within the non-cloud areas $S_1$ using the algorithm as described above and any other similar algorithms that fall within the scope of this disclosure.

Operation 1306 illustrates determining the numbers of data elements (e.g., pixels) within the edges of the clouds or non-cloud objects, respectively. The number of pixels assigned within the edges of the clouds (S_cloudLocatorEdge) may be determined. Similarly, the number of pixels assigned within the edges of the non-sky objects (S_nonskyLocatorEdge) may be determined. The number of pixels assigned within the edge of the sun (S_sunLocatorEdge) may also be calculated. The number of the rest of pixels that are not assigned to clouds, sun, or non-sky objects (S_restskyLocatorEdge) may be determined as well given that the total number of pixels of the image (S_total) is known.

Operation 1308 illustrates detecting color clusters associated with clouds and non-cloud objects using the color cluster engine 360. Operation 1310 illustrates determining the numbers of data elements (e.g., pixels) within the color clusters associated with the clouds and non-cloud objects, respectively. In some embodiments, the image data included in the same sky images may be provided to both the cloud locator engine 330 and the color cluster engine 360 for data processing. The color cluster engine 360 may detect color clusters associated with clouds or non-cloud objects in the sky images using the algorithm as described above and any other similar algorithms that fall within the scope of this disclosure.

The number of pixels within the detected color clusters associated with clouds (S_cloudClustering) may be determined. Similarly, the number of pixels within the detected color clusters associated with non-sky objects (S_nonskyClustering) and the number of pixels within the color clusters associated with the sun S_nonSkyClustering may be calculated, respectively. The number of the rest of pixels that are not assigned within the color clusters associated with clouds, sun, or non-sky objects (S_restskyClustering) may also be determined given that the total number of pixels in a sky image (S_total) is known.

Operation 1312 illustrates averaging corresponding results obtained at operations 1306 and 1308. The number of pixels belonging to the clouds in the same sky image may be determined using the formula of S_cloud=average (S_cloudLocatorEdge, S_cloudClustering). Similarly, the number of pixels belonging to non-sky objects may be obtained by averaging S_nonskyLocatorEdge and S_nonskyClustering, i.e., S_non-sky=average (S_nonskyLocatorEdge, S_nonskClustering). The number of pixels belonging to the sun may be calculated by S_sun=average (S_sunLocatorEdge, S_sunClustering). The number of pixels belonging to the rest area in the sky image may be determined by S_restsky=average (S_restskyLocatorEdge, S_restskyClustering). In an example, the arithmetic mean may be used to average corresponding results obtained at operations 1306 and 1308. It should be appreciated that any suitable averaging techniques may be employed to average the corresponding results.

Operation 1314 illustrates determining a cloud coverage. The cloud coverage may be determined based on a proportion of a number of pixels belonging to the clouds (S_cloud) to a number of pixels belonging the sky area (S_skytotal). In some embodiments, the S_skytotal may be determined by a total number of pixels in the image (S_total) minus a number of pixels belonging to the non-sky objects (S_non-sky), i.e., S_skytotal=S_total−S_non-sky. In this case, the cloud coverage may be determined using the formula of Coverage=S_cloud/(S_total−S_non-sky). In other embodiments, the S_skytotal may be determined using the formula of S_skytotal=S_cloud+S_sun+S_restsky; therefore, the coverage may be determined using the formula of Coverage=S_cloud/(S_cloud+S_sun+S_restsky).

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a user may be provided direct access to a resource instance, e.g., by giving a user an administrator login and password. In other embodiments, the provider network operator may allow users to specify execution requirements for specified applications and schedule execution of the applications on behalf of the user on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 14:
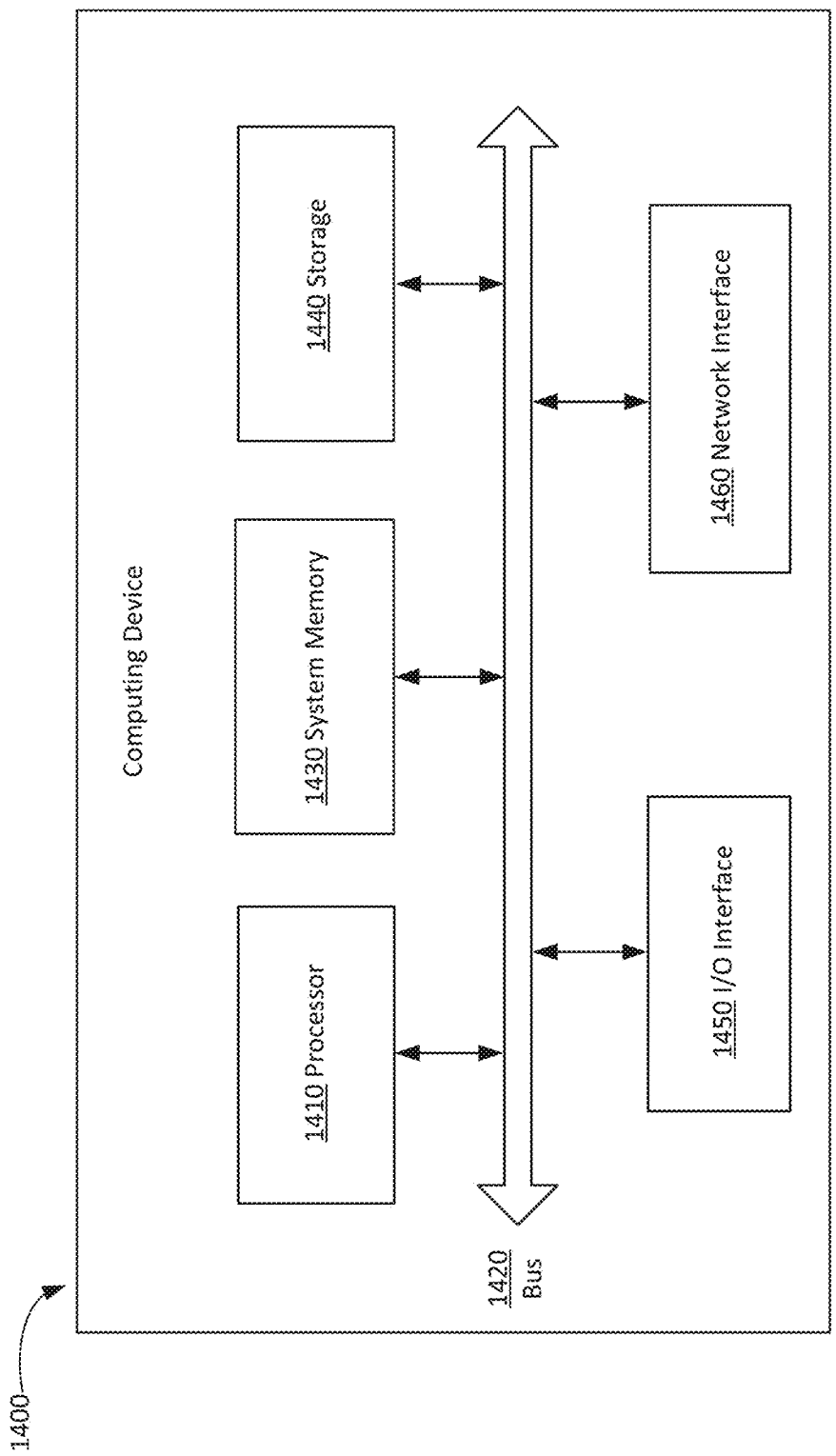
FIG. 14 is a schematic diagram illustrating an example computing device that may be used in accordance with the present disclosure.

In at least some embodiments, a server or computing device that implements a portion or all of one or more of the technologies described herein, including the techniques to implement the functionality of the cloud locator engine 330, the edge detection engine 250, the color cluster engine 360, and the cloud-coverage-determination ensemble process 1300, may include a general-purpose computer system that includes or is configured to access one or more computer-accessible media. FIG. 14 illustrates such a general-purpose computing device 1400. In the illustrated embodiment, computing device 1400 includes one or more processors 1410 (which may be referred herein singularly as "a processor 1410" or in the plural as "the processors 1410") are coupled through a bus 1420 to a system memory 1430. Computing device 1400 further includes a permanent storage 1440, an input/output (I/O) interface 1450, and a network interface 1460.

In various embodiments, computing device 1400 may be a uniprocessor system including one processor 1410 or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1430 may be configured to store instructions and data accessible by processor(s) 1410. In various embodiments, system memory 1430 may be implemented using any suitable memory technology, such as static random access memory (SRAM), synchronous dynamic RAM (SDRAM), nonvolatile/Flash-type memory, or any other type of memory.

In one embodiment, I/O interface 1450 may be configured to coordinate I/O traffic between processor 1410, system memory 1430, and any peripheral devices in the device, including network interface 1460 or other peripheral interfaces. In some embodiments, I/O interface 1450 may perform any necessary protocol, timing, or other data transformations to convert data signals from one component (e.g., system memory 1430) into a format suitable for use by another component (e.g., processor 1410). In some embodiments, I/O interface 1450 may include support for devices attached through various types of peripheral buses, such as a variant of the Peripheral Component Interconnect (PCI) bus standard or the Universal Serial Bus (USB) standard, for example. In some embodiments, the function of I/O interface 1450 may be split into two or more separate components, such as a north bridge and a south bridge, for example. Also, in some embodiments some or all of the functionality of I/O interface 1450, such as an interface to system memory 1430, may be incorporated directly into processor 1410.

Network interface 1460 may be configured to allow data to be exchanged between computing device 1400 and other device or devices attached to a network or network(s), such as other computer systems or devices as illustrated in FIG. 1. In various embodiments, network interface 1460 may support communication via any suitable wired or wireless general data networks, such as types of Ethernet networks, for example. Additionally, network interface 1460 may support communication via telecommunications/telephony networks such as analog voice networks or digital fiber communications networks, via storage area networks such as Fibre Channel SANs or via any other suitable type of network and/or protocol.

In some embodiments, system memory 1430 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1400 via I/O interface 1450. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1400 as system memory 1430 or another type of memory.

Further, a computer-accessible medium may include transmission media or signals such as electrical, electromagnetic or digital signals, conveyed via a communication medium such as a network and/or a wireless link, such as may be implemented via network interface 1460. Portions or all of multiple computing devices may be used to implement the described functionality in various embodiments, for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of determining a cloud coverage, comprising:
   detecting a plurality of color clusters among a plurality of data elements of an image;
   associating at least one of the plurality of color clusters with a cloud based on a characteristic color of the cloud;
   determining a number of data elements within the at least one of the plurality of color clusters;
   detecting a location of an object indicative of a cloud in the image based at least in part on training data and a plurality of features extracted from the image;
   detecting an edge of the object indicative of the cloud at the location;

determining a number of data elements within the edge of the object indicative of the cloud; and determining a cloud coverage based at least in part on the number of data elements within the at least one of the plurality of color clusters associated with the cloud and the number of data elements within the edge of the object indicative of the cloud.

2. The method of claim 1, further comprising:
detecting centroids of the plurality of color clusters.

3. The method of claim 2, further comprising:
associating a centroid of the at least one of the plurality of color clusters with the cloud based on the characteristic color of the cloud.

4. The method of claim 2, further comprising:
assigning the plurality of data elements of the image to a corresponding closest centroid based on color similarity.

5. The method of claim 1, wherein a number of the plurality of color clusters is selected from a range of 10 to 40.

6. The method of claim 1, further comprising:
associating at least one of the plurality of color clusters with a non-cloud object based on a characteristic color of the non-cloud object; and
determining a number of data elements within the at least one of the plurality of color clusters associated with the non-cloud object.

7. The method of claim 1, wherein the location of the object indicative of a cloud is presented as coordinates of four corners of a box surrounding the object indicative of the cloud.

8. The method of claim 1, wherein the training data comprise pre-labelled information relating to locations and types of clouds and locations of non-cloud objects, the non-cloud objects comprise a sun and non-sky objects.

9. The method of claim 8, further comprising;
determining a location of at least a non-cloud object in the image; and
detecting an edge of the at least a non-cloud object at the location.

10. The method of claim 1, wherein the plurality of features comprises at least an identification of a portion of the image as representing a cloud and a type of the cloud.

11. A system of determining a cloud coverage, comprising:
a processor; and
a memory communicatively coupled to the processor to configure the processor at least to:
detect a plurality of color clusters among a plurality of data elements of an image;
associate at least one of the plurality of color clusters with a cloud based on a characteristic color of the cloud;
determine a number of data elements within the at least one of the plurality of color clusters;
detect a location of an object indicative of a cloud in the image based at least in part on training data and a plurality of features extracted from the image;
detect an edge of the object indicative of the cloud at the location;
determine a number of data elements within the edge of the object indicative of the cloud; and
determine a cloud coverage based at least in part on the number of data elements within the at least one of the plurality of color clusters associated with the cloud and the number of data elements within the edge of the object indicative of the cloud.

12. The system of claim 11, the memory further configuring the processor at least to:
detect centroids of the plurality of color clusters.

13. The system of claim 12, the memory further configuring the processor at least to:
assign the plurality of data elements of the image to a corresponding closest centroid based on color similarity.

14. The system of claim 11, wherein the training data comprise pre-labelled information relating to locations and types of clouds and locations of non-cloud objects, the non-cloud objects comprises a sun and non-sky objects.

15. The system of claim 14, the memory further configuring the processor at least to:
determine a location of at least a non-cloud object in the image; and
detect an edge of the at least a non-cloud object at the location.

16. The system of claim 11, wherein the plurality of features comprises at least an identification of a portion of the image as representing a cloud and a shape of the cloud.

17. A non-transitory computer-readable storage medium bearing computer-readable instructions that upon execution on a computing device cause the computing device at least to:
detect a plurality of color clusters among a plurality of data elements of an image;
associate at least one of the plurality of color clusters with a cloud based on a characteristic color of the cloud;
determine a number of data elements within the at least one of the plurality of color clusters;
detect a location of an object indicative of a cloud in the image based at least in part on training data and a plurality of features extracted from the image;
detect an edge of the object indicative of the cloud at the location;
determine a number of data elements within the edge of the object indicative of the cloud; and
determine a cloud coverage based at least in part on the number of data elements within the at least one of the plurality of color clusters associated with the cloud and the number of data elements within the edge of the object indicative of the cloud.

18. The non-transitory computer-readable storage medium of claim 17, further comprising computer-readable instructions that upon execution on the computing device cause the computing device at least to:
detect centroids of the plurality of color clusters; and
associate a centroid of the at least one of the plurality of color clusters to a cloud based on the characteristic color of the cloud.

19. The non-transitory computer-readable storage medium of claim 17, further comprising computer-readable instructions that upon execution on the computing device cause the computing device at least to:
determine a location of at least a non-cloud object in the image, wherein the at least a non-cloud object comprises a sun or a non-sky object; and
detect an edge of the at least a non-cloud object at the location.

20. The non-transitory computer-readable storage medium of claim 17, wherein the plurality of features comprises at least an identification of a portion of the image as representing a cloud and a type of the cloud.

* * * * *